US006629247B1

(12) United States Patent
Hall et al.

(10) Patent No.: US 6,629,247 B1
(45) Date of Patent: Sep. 30, 2003

(54) METHODS, SYSTEMS, AND COMPUTER PROGRAM PRODUCTS FOR COMMUNICATIONS IN UNINTERRUPTIBLE POWER SUPPLY SYSTEMS USING CONTROLLER AREA NETWORKS

(75) Inventors: Richard Hall, Wake Forest, NC (US); Frederick E. Tassitino, Jr., Wake Forest, NC (US); Miguel E. Chavez, Raleigh, NC (US)

(73) Assignee: Powerware Corporation, Raleigh, NC (US)

( * ) Notice: Subject to any disclaimer, the term of this patent is extended or adjusted under 35 U.S.C. 154(b) by 0 days.

(21) Appl. No.: 09/537,974

(22) Filed: Mar. 28, 2000

(51) Int. Cl.$^7$ ................................................. G06F 1/26
(52) U.S. Cl. ..................... 713/300; 307/66; 370/395.42
(58) Field of Search ............................... 713/300, 310; 709/220, 221, 222, 340; 370/347, 395.42; 710/240, 243, 244; 307/66; 323/201

(56) References Cited

U.S. PATENT DOCUMENTS

| | | | |
|---|---|---|---|
| 4,475,047 A | * 10/1984 | Ebert, Jr. ...................... 307/66 |
| 4,837,779 A | 6/1989 | Lundgren ...................... 375/10 |
| 4,935,861 A | 6/1990 | Johnson, Jr. et al. ......... 363/132 |
| 4,980,812 A | 12/1990 | Johnson, Jr. et al. .......... 363/44 |
| 5,185,536 A | 2/1993 | Johnson, Jr. et al. .......... 307/66 |
| 5,237,570 A | * 8/1993 | Smolinske et al. .......... 370/348 |
| 5,291,383 A | 3/1994 | Oughton ...................... 363/17 |
| 5,303,348 A | 4/1994 | Botzenhardt et al. ........ 395/325 |
| 5,319,571 A | 6/1994 | Langer et al. ............... 364/492 |
| 5,323,385 A | 6/1994 | Jurewicz et al. ............... 370/43 |
| 5,381,554 A | * 1/1995 | Langer et al. ................. 714/14 |
| 5,386,512 A | * 1/1995 | Crisman et al. ............. 709/228 |
| 5,436,512 A | 7/1995 | Inam et al. .................... 307/58 |
| 5,469,098 A | 11/1995 | Johnson, Jr. .................. 327/190 |
| 5,539,778 A | 7/1996 | Kienzler et al. ............. 375/317 |
| 5,551,053 A | 8/1996 | Nadolski et al. ............. 395/829 |
| 5,633,539 A | 5/1997 | Tassitino, Jr. ................. 307/64 |
| 5,675,830 A | 10/1997 | Satula ......................... 395/829 |
| 5,732,074 A | 3/1998 | Spaur et al. ................. 370/313 |
| 5,854,454 A | 12/1998 | Upender et al. ............. 187/247 |
| 5,889,465 A | * 3/1999 | Mercadante et al. ........ 340/538 |
| 5,896,280 A | 4/1999 | Gucyski et al. ............... 363/24 |
| 6,201,319 B1 | * 3/2001 | Simonelli et al. ............. 307/26 |
| 6,274,950 B1 | * 8/2001 | Gottlieb et al. ............... 307/66 |

OTHER PUBLICATIONS

"Axxium Pro, The Best Solution"; www.bestpower.com; Best Power; 1999.
Hannover; "Controller Area Network, A Serial Bus System—Not Just For Vehicles"; www.esd-electronics.com/pdf-file/CAN/English/intro-e.pdf; pp. 1–8.
Robert Bosch; "CAN Specification, Version 2.0"; 1991.
PCT International Search Report; PCT US 01/40027; Oct. 17, 2001.

* cited by examiner

*Primary Examiner*—Thomas Lee
*Assistant Examiner*—Thuan Du
(74) *Attorney, Agent, or Firm*—Myers Bigel Sibley & Sajovec

(57) ABSTRACT

Modules included in a UPS system can communicate over a Controller Area Network using messages having separate fields within an arbitration field. In particular, the separate fields can be separate priority fields, separate module identifier fields, and separate source and destination routing fields. The separate priority field can allow identical message types having different priority to be transmitted within the UPS system. For example, in a UPS system according to the invention, a rectifier off command can have greater priority than a rectifier reset command. The separate module identifier fields can uniquely identify the location of a module in the UPS system which transmitted the message. For example, the module identifier can be provided by customized wiring in a wiring harness connected to a respective communications interface circuit. The separate destination routing fields can be used to transmit messages to and from bridges in the UPS system. The message can also include separate data fields that organize the data into data categories and subcategories.

41 Claims, 9 Drawing Sheets

| Message | Priority Field | Message Type Field |
|---|---|---|
| Inverter Commands | 00 | 0000 1010 0000 |
|  | 01 | 0000 1010 0000 |
| Rectifier Commands | 00 | 0000 1010 0010 |
|  | 01 | 0000 1010 0010 |
| Inverter Data | 00 | 1000 1010 0000 |
| Rectifier 1 Data | 00 | 1000 1010 0010 |
| Rectifier 2 Data | 00 | 1000 1010 0011 |

| Databyte | Meter Values | | | Status Information | | | System Information | | |
|---|---|---|---|---|---|---|---|---|---|
| | Voltage | Frequency | Power | Rectifier | Inverter | Secondary Power Source | Rectifier | Inverter | Secondary Power Source |
| 0 | | | | | | | | | |
| 1 | DATA | | | | | | | | |
| 2 | | DATA | | | | | | | |
| 3 | | | DATA | | | | | | |
| 4 | | | | DATA | | | | | |
| 5 | | | | | DATA | | | | |
| 6 | | | | | | DATA | | | |
| 7 | | | | | | | DATA | | |
| | | | | | | | | DATA | |
| | | | | | | | | | DATA |

FIG. 7.

METHODS, SYSTEMS, AND COMPUTER PROGRAM PRODUCTS FOR COMMUNICATIONS IN UNINTERRUPTIBLE POWER SUPPLY SYSTEMS USING CONTROLLER AREA NETWORKS

FIELD OF THE INVENTION

The invention relates to electrical power devices and methods of operation thereof, and more particularly, to uninterruptible power supply systems and methods of operation thereof.

BACKGROUND OF THE INVENTION

Uninterruptible Power Supply (UPS) systems are power conversion systems that are commonly used to provide conditioned, reliable power for devices and systems such as computer networks, telecommunications networks, medical equipment and the like. UPS systems can provide temporary power to the devices and systems so that the devices and systems can continue to operate despite the loss of the primary power source and thereby can reduce the likelihood that valuable data may be lost.

UPS systems may provide uninterrupted power by switching from a primary power source to a secondary power source if loss of the primary power source is detected. When the primary power source is restored, the UPS system may switch from the secondary power source back to the primary power source. Similarly, the UPS system may switch from the primary power source to the secondary power source if the UPS system determines that the primary power source is inappropriate. For example, if a voltage level of the primary power source is less than a minimum acceptable level, the UPS system may provide uninterrupted power by switching from the primary power source to the secondary power source.

Conventional UPS systems can include separate modules that provide respective functions to provide the overall functions of the UPS system. For example, some conventional UPS systems include separate modules such as rectifiers, inverters, batteries, and switches that cooperate to provide the overall function of the UPS systems. Moreover, the separate modules may need to communicate to provide the overall UPS system functions. For example, in some of the scenarios described above, a rectifier module may need to communicate the condition of the power provided by the primary power source so that the UPS system can determine whether to switch to the secondary power source.

Unfortunately, in some conventional UPS systems, the interconnect used to provide communication between the separate modules may be expensive and difficult to manufacture or modify. For example, some conventional UPS systems use point-to-point wiring to connect the separate modules. Such a system may, use many separate wires to provide communications between the separate modules. Adding new modules may be difficult as new wiring may need to be added to connect the new modules to the existing modules.

In other conventional systems the modules may communicate over a network. Unfortunately, in many of these conventional systems some communications between modules may be problematic. In particular, in systems where modules can send identical communications the communications may conflict, which may result in less important communications being transmitted while more important communications are lost. Such systems are discussed further, for example, in U.S. Pat. No. 5,323,385 to Jurewicz et al. entitled *Serial Bus Communication Method in a Refrigeration System.*

Furthermore, it may be desirable to place the UPS system and the system or device to which the UPS system provides power in separate locations. For example, the UPS system may be located in the basement of a building while the system (such as a mainframe computer system) is located on a different floor of the building. Unfortunately, in conventional UPS systems, monitoring the status of the UPS system from the system or device to which power is provided may be difficult. Accordingly, there is a need for improved communications in UPS systems.

SUMMARY OF THE INVENTION

The invention can provide improved methods, systems, and computer program products for communications in UPS systems over Controller Area Networks. In one embodiment of the invention, transmission of a first message is initiated at a first time according to a controller area network message frame format from a first module in the UPS system. The message is of a first type and includes first priority information in a separate priority field of a first controller area network message frame. Transmission of a second message is initiated at the first time according to the controller area network message frame format from a second module in the UPS system. The second message is of the first type and includes second priority information in the separate priority field of the second controller area network message frame. The first message is received by a third module if the first priority information is higher than the second priority information. Alternatively, the second message is received by the third module if the second priority information is higher than the first priority information.

The separate priority field can allow identical message types having different priority to be transmitted within the UPS system. For example, in a UPS system according to the invention, a rectifier off command can have higher priority than a rectifier reset command.

Accordingly, in a UPS system according to the invention wherein different modules issue commands to the same module, the more important commands can have priority over less important commands. For example, in a UPS system according to the invention, a rectifier off command can have higher priority than a rectifier reset command. Accordingly, in a UPS system according to the invention wherein different modules issue commands to the rectifier, the more important rectifier commands can have priority over less important rectifier commands.

In a further embodiment of the invention, the first and second messages include respective first and second module identifiers associated with the respective first and second modules. In particular, the CAN message format according to the invention also can include a separate module identifier field that uniquely describes the location of the module in the UPS system which transmitted the CAN message. For example, the module identifier can be provided by customized wiring in a wiring harness connected to an associated communications interface circuit. Each communications interface circuit can determine its location in the UPS system based on the specific wiring provided to the communications interface circuit by the wiring harness. Accordingly, each module in the UPS system can format the CAN message with its associated unique module identifier thereby enabling the UPS system to resolve CAN access conflicts in situations where modules transmit identical messages having the same priority at the same time.

In another embodiment of the invention, the first message includes destination routing information in a separate destination routing field of the controller area network message frame, the destination routing information identifies a bridge module in the first UPS system that electrically couples the first UPS system to a second UPS system. Accordingly, the first message is received at the bridge and relayed to second UPS system. The separate destination routing field can be used to transmit commands to a bridge in the UPS system. In particular, the bridges can be identified by a bridge ID. In operation, a command can be transmitted to another UPS system via a respective bridge by including the bridge identifier of the bridge which connects the two UPS systems in the separate destination routing field.

In another embodiment of the invention, the first message includes a first data field associated with a category of data included in the first message and a second data field associated with a sub-category of data included in the category of data. In particular, bytes of data field can be organized as categories and subcategories that describe the types of data included in the data field and subcategories wherein each subcategory is a type of data associated with a particular category. For example, the value of byte 0 of the data field can indicate the category in which the data is included and byte 1 can identify the subcategory in which the data in included. Data bytes 2 through 7 can be the data identified by the category and subcategory identifiers. The categories of the data can allow the data to be organized in a hierarchical fashion, thereby providing improved organization for system design and debug.

BRIEF DESCRIPTION OF THE DRAWINGS

FIG. 7 is a table that illustrates data associated with exemplary messages according to an embodiment of the invention.

DETAILED DESCRIPTION OF THE INVENTION

The invention now will be described more fully hereinafter with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the described invention may be embodied as methods or devices. Accordingly, different aspects of the invention may take the form of a hardware embodiment, a software embodiment or an embodiment combining software and hardware aspects.

The invention is also described using flowchart illustrations and block diagrams. It will be understood that each block (of the flowchart illustrations and block diagrams), and combinations of blocks, can be implemented by computer program instructions. These program instructions may be provided to a processor(s), such as a microprocessor, microcontroller or other processor provided within an uninterruptible power supply system, such that the instructions which execute on the processor(s) create means for implementing the functions specified in the block or blocks. The computer program instructions may be executed by the processor(s) to cause a series of operational steps to be performed by the processor(s) to produce a computer implemented process such that the instructions which execute on the processor(s) provide steps for implementing the functions specified in the block or blocks.

Accordingly, the blocks support combinations of means for performing the specified functions, combinations of steps for performing the specified functions and program instruction means for performing the specified functions. It will also be understood that each block, and combinations of blocks, can be implemented by special purpose hardware-based systems which perform the specified functions or steps, or combinations of special purpose hardware and computer instructions.

As used herein, "power" includes, but is not limited to, 3-phase or single phase electrical power that can be provided to a load. The term "power" can include power provided by Direct Current (DC) or Alternating Current (AC).

Figure 1:
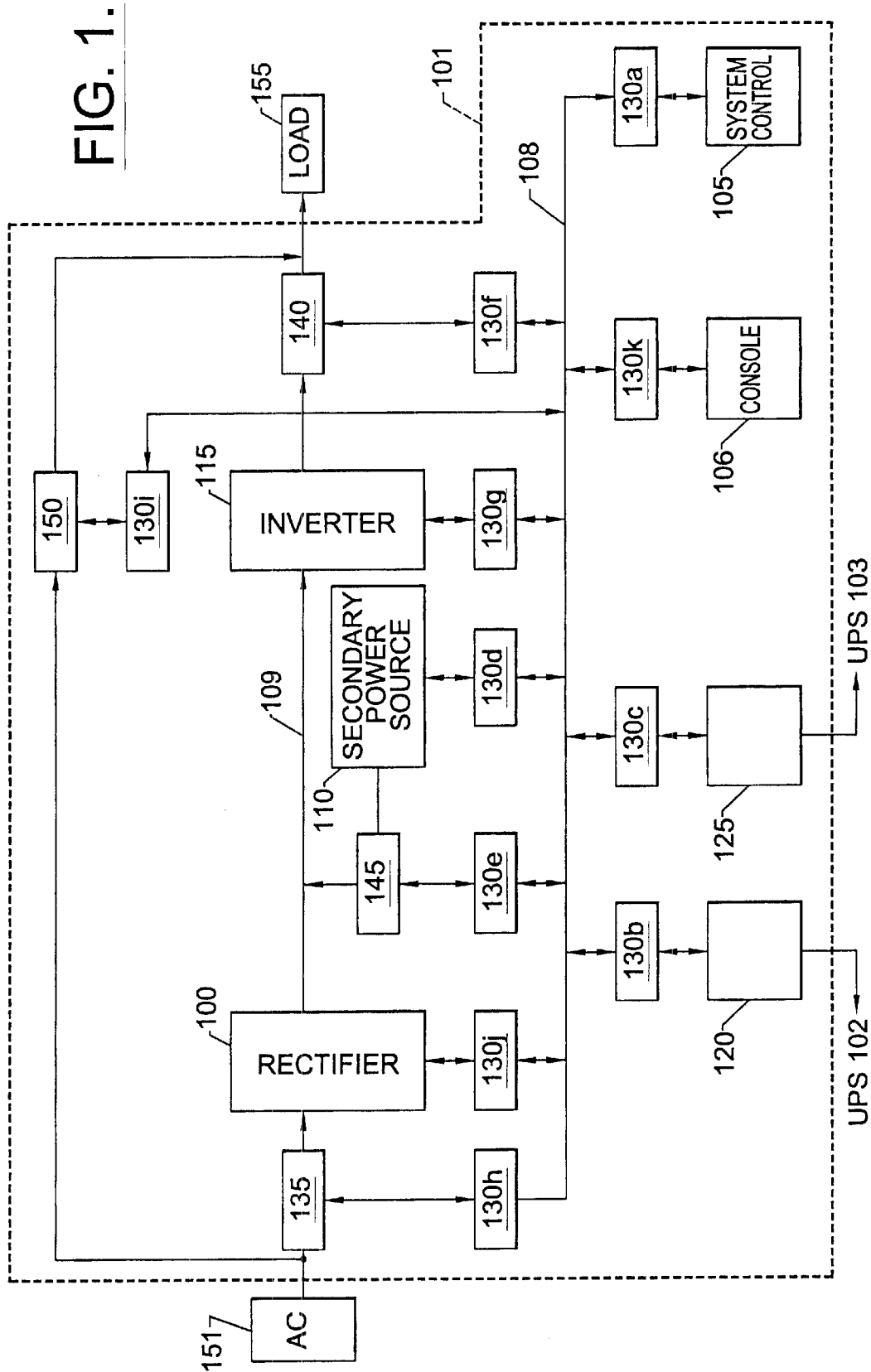
FIG. 1 is a block diagram that illustrates a UPS system according to an embodiment of the invention.

FIG. 1 is a block diagram that illustrates systems and methods of an embodiment of a UPS system 101 according to the invention. The UPS system 101 can provide AC power to a load 155 from a primary power source 151 or a secondary power source 110. The primary power source can be any source of AC power, such as a generator or a utility. The secondary power source 110 can be a battery, a generator, a capacitor, or other device that can be used to provide an alternative source of AC power to the load 155. The load 155 can be a system or device such as one or more computers.

The UPS system 101 can operate in a normal mode or a bypass mode. In normal mode, the UPS system 101 can derive AC power from the primary power source 151 and provide the derived AC power to the load 155. For example, the UPS system 101 can derive AC power from the primary power source 151 by converting the AC power from the primary power source 151 to DC power and converting the DC power back to AC power which is provided to the load 155.

In bypass mode, the UPS system 101 can electrically couple the AC power from the primary power source 151 to the load 155. In other words, in bypass mode the AC power may be provided from the primary power source 151 directly to the load 155. Bypass mode may be used, for example, to electrically isolate the UPS system 101 from the primary power source 151 and the load 155 when the UPS system 101 is being serviced.

According to FIG. 1, the UPS system 101 can operate under the control of a system control module 105 that coordinates the operations of other modules in the UPS system 101 using communications over a Controller Area Network (CAN) 108. In particular, the system control module 105 can communicate with the other modules in the UPS system 101 over the CAN 108 through communications interface circuits 130 that electrically couple the respective modules to the CAN 108. Other modules can include inverters, secondary power sources, rectifiers, bridges, and the like which are described in greater detail below.

The Controller Area Network 108 can be used, for example, to determine the condition of the AC power from the primary power source 151 and to switch from the primary power source 151 to the secondary power source 110 by transmitting and receiving CAN 108 messages in the UPS system 101. For example, the system control module 105 can transmit a command message to other modules in the UPS system 101 that requests information or instructs a module to take specified action(s). Accordingly, each communications interface circuit 130 can determine the status or control the operations of its associated module. It will be understood that the communications interface circuits 130 can be separate from or part of the associated module. For example, the system control module 105 may include the communications interface circuit 130a.

Furthermore, information associated with the other modules in the UPS system 101 can be transmitted without requests from the system control module 105. For example, a module may periodically transmit its respective status information over the CAN 108 and another module may receive the status information from the transmitting module.

Referring still to FIG. 1, AC power is provided from the primary power source 151 to a first bypass switch 135 that can electrically couple AC power to a rectifier 100 in a first state and electrically decouple AC power from the rectifier 100 in a second state. The first bypass switch 135 can be set in the first state for normal mode operation and in the second state for bypass mode operation.

A second bypass switch 150 can electrically couple the AC power through the first bypass switch 135 to the load 155 in a first state and decouple the AC power to the load 155 in a second state. Accordingly, the first and second bypass switches 135, 150 can be used to provide AC power from the primary power source 151 to the load 155 in bypass mode.

The first and second bypass switches 135,150 can be set to desired states by the associated communications interface circuits 130h, 130i in response to commands transmitted by the system control module 105 over the CAN 108. For example, the system control module 105 can set the first bypass switch 135 in the first state by transmitting a command to the communications interface circuit 130h over the CAN 108. The communications interface circuit 130h thereby causes the first bypass switch 135 to enter the first state to electrically couple AC power to the rectifier 100.

The rectifier 100 rectifies the AC power to provide DC power on a DC bus 109. The rectifier 100 interfaces to the CAN 108 via a communications interface circuit 130j. The rectifier 100 can provide 12-pulse rectification using, for example, two 6-pulse rectifiers. Rectifiers are described, for example, in U.S. patent application Ser. No. 09/467,655 entitled "Twelve Pulse Rectifiers Including Separate Six Pulse Controller and Methods of Controlling Same," which is commonly assigned to the assignee of the present application and the disclosure of which is incorporated herein by reference in its entirety.

The communications interface circuit 130j can be used to determine the current status of the rectifier 100 and to control the operations thereof. For example, the system control module 105 can turn the rectifier 100 on and off by transmitting respective on and off commands over the CAN 108 to the communications interface circuit 130j.

The DC power on the DC bus 109 can be provided to the secondary power source 110 through a secondary power switch 145. The secondary power switch 145 can be accessed over the CAN 108 via a communications interface circuit 130e. When the DC power is provided to the secondary power source 110, the secondary power source 110 may be charged through the secondary power switch 145. For example, if the secondary power source 110 is a battery, DC power provided to the battery may increase the charge of the battery. Furthermore, the secondary power switch 110 can provide DC power on the DC bus 109 through the secondary power switch 145. Accordingly, DC power can be provided in the DC bus 109 by the rectifier 100 or the secondary power source 110 when the UPS system 101 determines that AC power should be provided to the load 155 by the secondary power source 110.

The secondary power source 110 interfaces to the CAN 108 via a communication interface circuit 130d. The status of the secondary power source 110 may be determined by transmitting commands to and receiving data from the communications interface circuit 130d. For example, the level of charge on the battery may be determined via the communications interface circuit 130d.

An inverter 115 inverts the DC power on the DC bus 109 to provide AC power to the load 155 via an output switch 140. Inverters are described, for example, in U.S. Pat. No. 4,935,861 to Johnson et al., the entire disclosure of which is incorporated herein by reference. The inverter 115 can be controlled and monitored over the CAN 108 via a communications interface circuit 130g. For example, the inverter 115 can be reset by a reset command transmitted over the CAN 108 to the communications circuit 130g.

The output switch 140 can electrically couple the AC power provided by the inverter 115 to the load 155 in a first state and electrically decouple the AC power provided by the inverter 115 from the load 155 in a second state. The state of the output switch 140 can be controlled by commands issued over the CAN 108 to a communications interface circuit 130f associated with the output switch 140.

A console 106 can transmit and receive commands and data over the CAN 108 via a communications interface circuit 130k. The console 106 can be used, for example, to monitor the status or control of the modules in the UPS system 101.

First and second bridges 120, 125 are electrically coupled to the CAN 108 via respective communications interface circuits 130b, 130c and to respective UPS systems 102, 103. The first and second bridges 120, 125 can be used to transmit and receive commands and data from the UPS system 101 to respective UPS systems 102, 103. For example, the first bridge 120 can be used to transmit commands from the system control module 105 to the UPS system 102. As described herein, the bridges 120, 125 can be used to interface the CAN 108 to UPS systems that include CANs which operate at different speeds or use different message frame formats. In particular, some CANs operate at 1 megabyte/second while other CANs operate at 256 kilobits/second or 125 kilobits/second. Further, some CANs operate using a standard format while other CANs operate using an extended format. Accordingly, the bridges can be used to transmit and receive commands by data between UPS systems that communicate using different speeds and formats.

Figure 2:
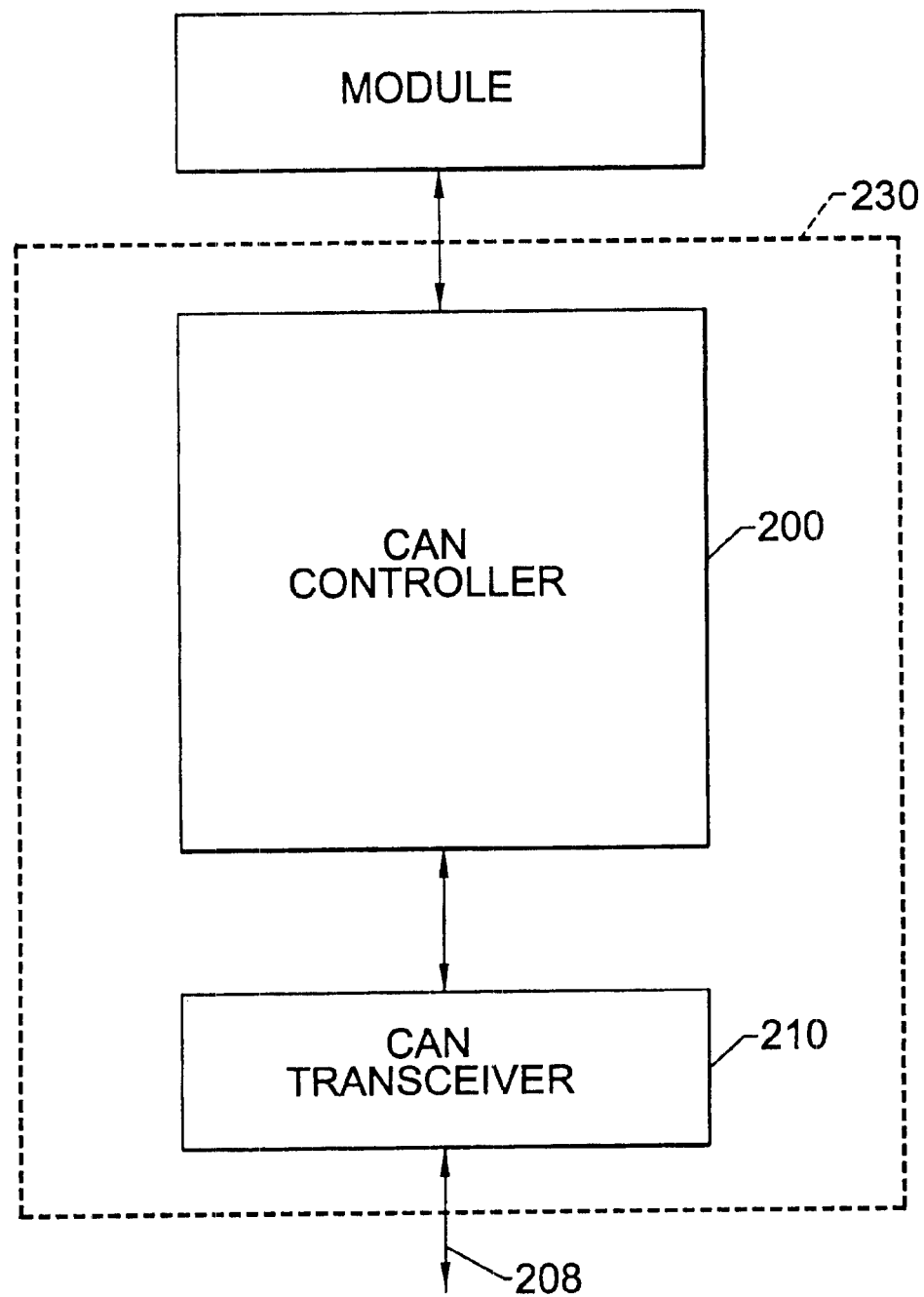
FIG. 2 is a block diagram that illustrates a communications interface circuit according to an embodiment of the invention.

FIG. 2 is a block diagram that illustrates a communications interface circuit 230 that may be used with the UPS system 101 of FIG. 1 according to an embodiment of the invention. The communications interface circuit 230 includes a CAN controller 200 that transmits and receives the commands and data described herein over the CAN 208 and is electrically coupled to an associated module of the UPS system 101, such as inverter module 115. For example, the CAN controller 200 included in the communications interface circuit 130j is electrically coupled to the rectifier module 100 and can, therefore, be used to determine the status of the rectifier module 100 and issue commands thereto. Furthermore, the CAN controller 200 can transmit the status of the rectifier module 100 over the CAN 108 as a CAN message via a CAN transceiver 210. The CAN transceiver 210 can be a differential transceiver that transmits and receives data and commands at voltage levels appropriate for use in CAN systems. The CAN transceiver 210 can be, for example, a 485-differential type transceiver marketed by Phillips Semiconductors, Inc.

The CAN controller 200 can be implemented using a microcontroller, such as an ST10F167 marketed by ST Microelectronics, Inc. The microcontroller can be programmed with computer program code which carries out operations according to the embodiments of the invention. Moreover, the microcontroller can be reprogrammed to carry out different operations so that the communications interface circuits 130 can be associated with any of the modules in the UPS system 101. For example, a communications interface circuit 130 according to the invention, can be programmed to be associated with the inverter module 115 or the rectifier module 100.

Figure 3A:
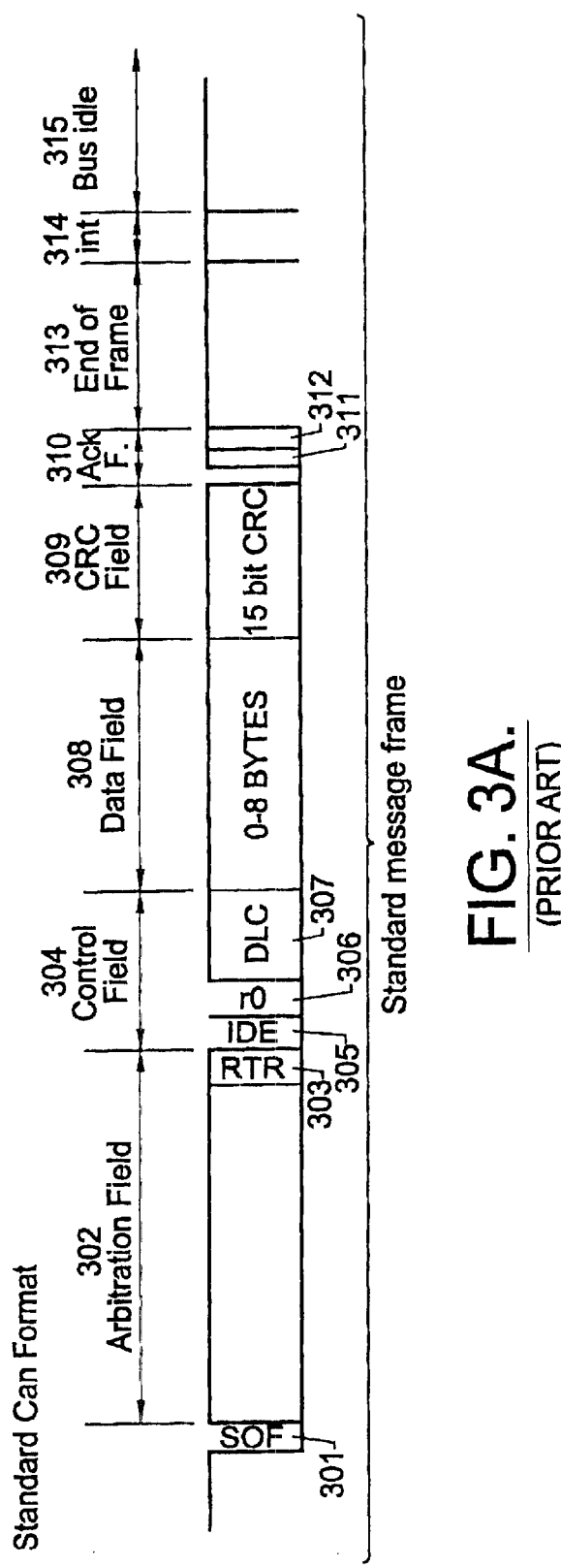
FIGS. 3A and 3B are block diagrams that illustrate conventional standard and extended Controller Area Network message frame formats, respectively.
Figure 3B:
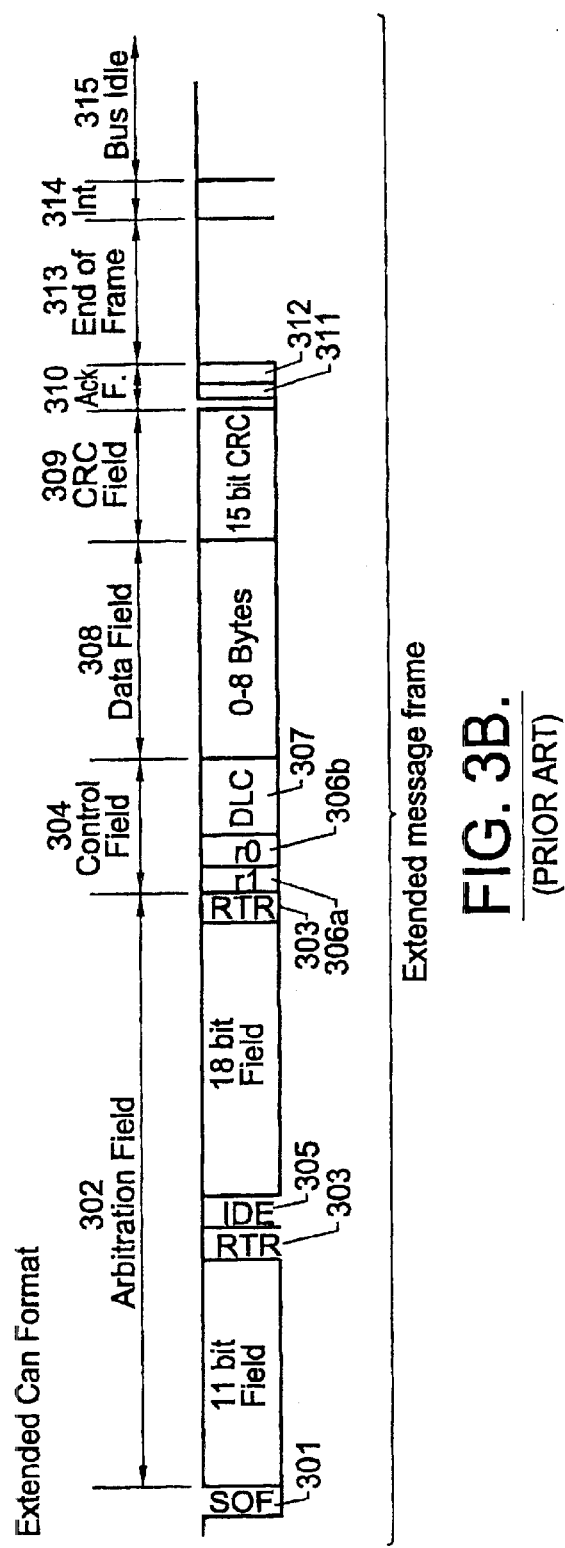

FIGS. 3A and 3B are diagrams which illustrate standard and extended CAN message frame formats, respectively. In the standard format, the message field is 11 bits, and in the extended format the length of the message field is 29 bits. The message field is transmitted over the CAN 108 in a CAN message frame format shown in FIGS. 3A and 3B. The CAN protocol supports two message frame formats, the only essential difference being in the length of the identifier (ID). In the standard format the length of the ID is 11 bits and in the extended format the length is 29 bits. The message frame for transmitting messages on the bus can include seven main fields.

A standard CAN frame format can begin with a "start of frame" bit 301 followed by an "arbitration field" 302 that can include an "RTR" (remote transmission request) bit 303, which indicates whether it is a data frame or a request frame without any data bytes (remote frame).

The "control field" 304 contains the IDE (identifier extension) bit 305, which indicates either standard format or extended format, a bit 306 reserved for future extensions and, in the last 4 bits 307 a count of the data bytes in the data field. The "data field" 308 can be 0 to 8 bytes in length and can be followed by a "CRC field" 309, which is used as a frame security check for detecting bit errors.

The "ACK field" 310 can include an ACK slot bit 311 and an ACK delimiter bit 312. The end of the message is indicated by "end of frame" 313. "Intermission" (Int) 314 is the minimum number of bit periods separating consecutive messages. If there is no following bus access by any station, the bus remains idle ("bus idle" 315). CAN message frame formats are further described, for example, in The Bosch CAN Specification, 1991 Robert Bosch Gmbh, Postfach 50, D-7000 Stuffgart 1 and in Controller Area Network (CAN), A Serial Bus System—Not Just For Vehicles, by ESD GMBH Hanover.

Figure 4:
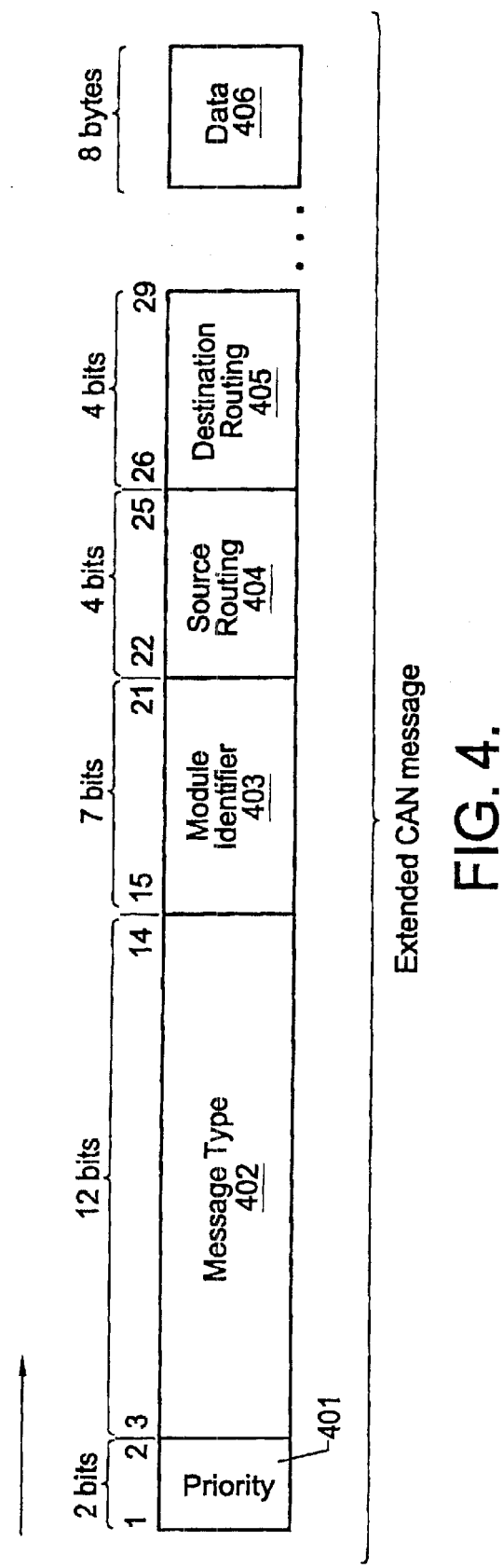
FIG. 4 is a diagram of a message using a Controller Area Network message frame format according to an embodiment of the invention.

FIG. 4 is a diagram that illustrates extended CAN messages and data formats according to an embodiment of the invention. CAN messages according to the invention can be transmitted over the CAN 108 using the CAN frame formats shown in FIGS. 3A and 3B. In particular, a CAN message according to an embodiment of the invention can include priority fields 401, module identifier fields 403, and source and destination routing fields 404,405. These fields can be included as separate fields in the arbitration field 312 of the CAN frame formats shown in FIGS. 3A and 3B. Message data can also be included in the data fields 406 of CAN message frame formats. CAN messages according to the invention can also be formatted using fewer bits. The message type field 402 can include information that identifies what type of data is included in the CAN message according to the invention.

Figures 5, 6:
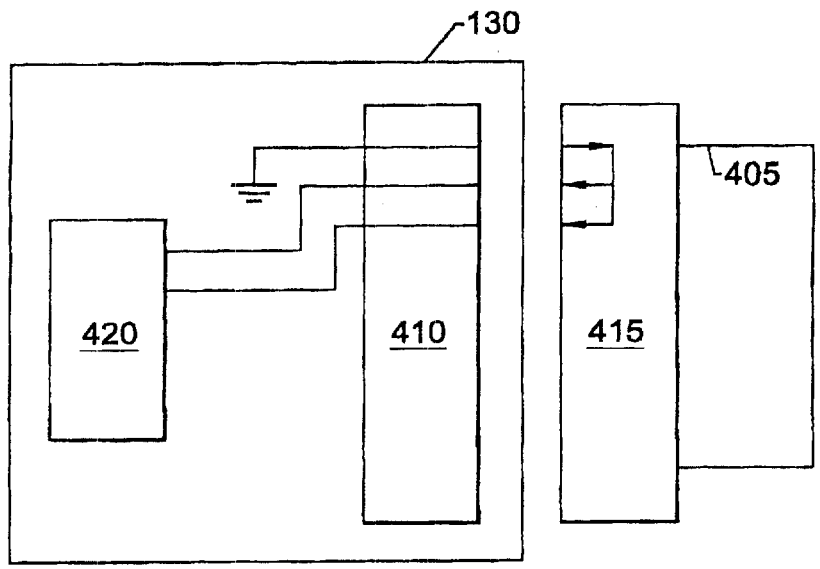
FIG. 5 is a table that illustrates exemplary CAN messages according to another embodiment of the invention.
FIG. 6 is a block diagram of a module identification circuit according to another embodiment of the invention.

The fields shown in FIG. 4 can be binary codes that are transmitted serially over the CAN 108. For example, FIG. 5 is a table of some exemplary CAN messages with respective priorities and message type fields according to the invention. In particular, CAN messages can include rectifier commands (such as "turn on" and "shut down"), inverter commands, (such as "turn on" and "shut down") and messages including data related to particular modules. The particular command can be specified as part of the data field in the CAN message. For example, the inverter message type (inverter command) can be specified in the message type field 402 while the particular command to the inverter module 115, such as an inverter "shut down" command, can be specified in the 8 bytes of data included in the data field 406 of the CAN message. As shown in FIG. 5, according to the invention, there can be a plurality of priorities for a single message type. For example, an inverter "shut down" command can have priority 00 while an inverter "turn on" command can have priority 01. Other commands and messages according to the invention are possible.

In operation, the modules in the UPS system 101 can transmit and receive commands and data according to the CAN message frame formats described above. In particular, the CAN messages can include a message type 402 that indicates the nature of the command for the data included in the CAN message. For example, the message type 402 can identify the CAN message as being an inverter command, a rectifier command, a command for a particular switch, or a bridge command. Other commands also are possible.

When more than one module transmits on the CAN 108, conflicts over access to the CAN 108 may occur. These access conflicts can be resolved by bitwise arbitration as the modules transmit their respective messages. In particular, the bitwise arbitration can be performed using a "wired and" mechanism, by which the dominant state (logical 0) overwrites the recessive state (logical 1), the arbitration for the CAN 108 is lost by those modules with recessive transmission and dominant observation.

In particular, when a first module attempts to transmit over the CAN 108, the first module monitors the logic level of the data detected on the CAN 108 as the first module transmits. If the logic level on the CAN 108 detected by the first module is equal to what the first module transmitted, the first module continues transmission. However, if the logic level detected on the CAN 108 by the first module is not equal to what the first module transmitted, the first module ceases transmission. For example, if two modules begin transmitting simultaneously, the module which first transmits a low logic level when the other module transmits a high logic level will gain access to the CAN 108.

As shown in FIG. 4, an example of an extended CAN message format according to the invention includes a separate priority field 401 (bits 1 and 2). The separate priority field 401 can allow identical message types having different priority to be transmitted within the UPS system 101. For example, a rectifier off command can have higher priority than a rectifier reset command. Accordingly, in a UPS system wherein different modules issue commands to the rectifier, the more important rectifier commands can have priority over less important rectifier commands.

The message type 402 also can identify the message as containing data related to a particular module. For example, the message type can identify the data as being related to the status of one of the modules in the UPS system 101.

The CAN message format according to the invention also can include a separate module identifier field (bits 15–21) that uniquely describes the location of the module in the UPS system 101 which transmitted the CAN message. For example, the module identifier 403 can be provided by customized wiring in a wiring harness 405 connected to the respective communications interface circuit 130 as shown in FIG. 6. Each communications interface circuit 130 can determine its location in the UPS system 101 based on the specific wiring provided to the communications interface circuit 130 by the wiring harness 405. Accordingly, each module in the UPS system 101 can format the CAN message with its associated unique module identifier 403 thereby enabling the UPS system 101 to resolve CAN access conflicts in situations where modules transmit identical messages having the same priority at the same time.

Referring to FIG. 6, each communications interface circuit 130 can include a first connector 410 wired to provide a signal to a second connector 415 when the first and second connectors 410, 415 are coupled together. For example, as shown in FIG. 6, when the first and second connectors 410, 415 are coupled together, a ground signal can be coupled from the first connector 410 to the second connector 415. The second connector 415 couples the signal back to a unique combination of inputs of the first connector 410 which then couples the signal to a decoder 420 on the communications interface circuit 130. The decoder 420 is used to recognize the unique combination and thereby identifies the location of the associated communications interface circuit.

The CAN message format according to the invention also can include separate source and destination routing fields 404, 405 (bits 22–25, 26–29). The separate destination routing field 405 can be used to transmit commands to a bridge in the UPS system 101. In particular, the first and second bridges 120, 125 are identified by respective bridge IDs. In operation, a command can be transmitted to another UPS system via a bridge by including the bridge identifier of the bridge which connects the two UPS systems in the separate destination routing field 405. For example, referring to FIG. 1, the system control module 105 can transmit a command to a module in the UPS system 103 by including the bridge identifier of the first bridge 120 in the separate destination routing field 405 of the command directed to the UPS system 103.

The separate source routing field 404 is manipulated by the bridge to which a command is directed. In particular, the bridge to which a command is directed includes a system identifier in the separate source routing field 404 of the CAN message when the message is relayed to the destination UPS system. For example, if the system control module 105 transmits a command to the UPS system 103, the first bridge 120 includes the system identifier of the UPS system 101 in the message from the system control module 105. Accordingly, the message relayed to the UPS system 103 can be traced as originating from the UPS system 101 via the first bridge 120.

FIG. 7 is a table that illustrates data associated with the CAN messages described with reference to FIG. 4. In particular, the data included in the CAN messages can include bytes of data associated with the message. The bytes of data can be organized as categories that describe the types of data included in the data field 406 of FIG. 4 and subcategories wherein each subcategory is a type of data associated with a particular category. In particular, the value of byte 0 of the data field 406 can indicate the category in which the data is included and byte 1 can identify the subcategory in which the data in included. Data bytes 2 through 7 can be the data identified by the category and subcategory identifiers.

For example, in the described embodiment, a value of 0 in data byte 0 can identify the category of the data included in data bytes 2 through 7 as meter values associated with the system. Furthermore, the value of data byte 1 can identify the subcategory of the data included in data bytes 2 through 7, for example, as voltage, frequency or power values.

Therefore, the data category and subcategory can identify that the data included in data bytes 2 through 7 is in the category of meter values and the subcategory of voltage frequency, or power values. Data byte 0 can also indicate the category of data included in data bytes 2 through 7 as status information or system information. In particular, the status information can be organized as status information associated with each of the modules in the UPS system such as the rectifier, the inverter and the secondary power source. The system type information can be similarly organized into subtypes of each of the modules in the UPS system, such as the rectifier, the inverter and the secondary power source.

Figure 8:
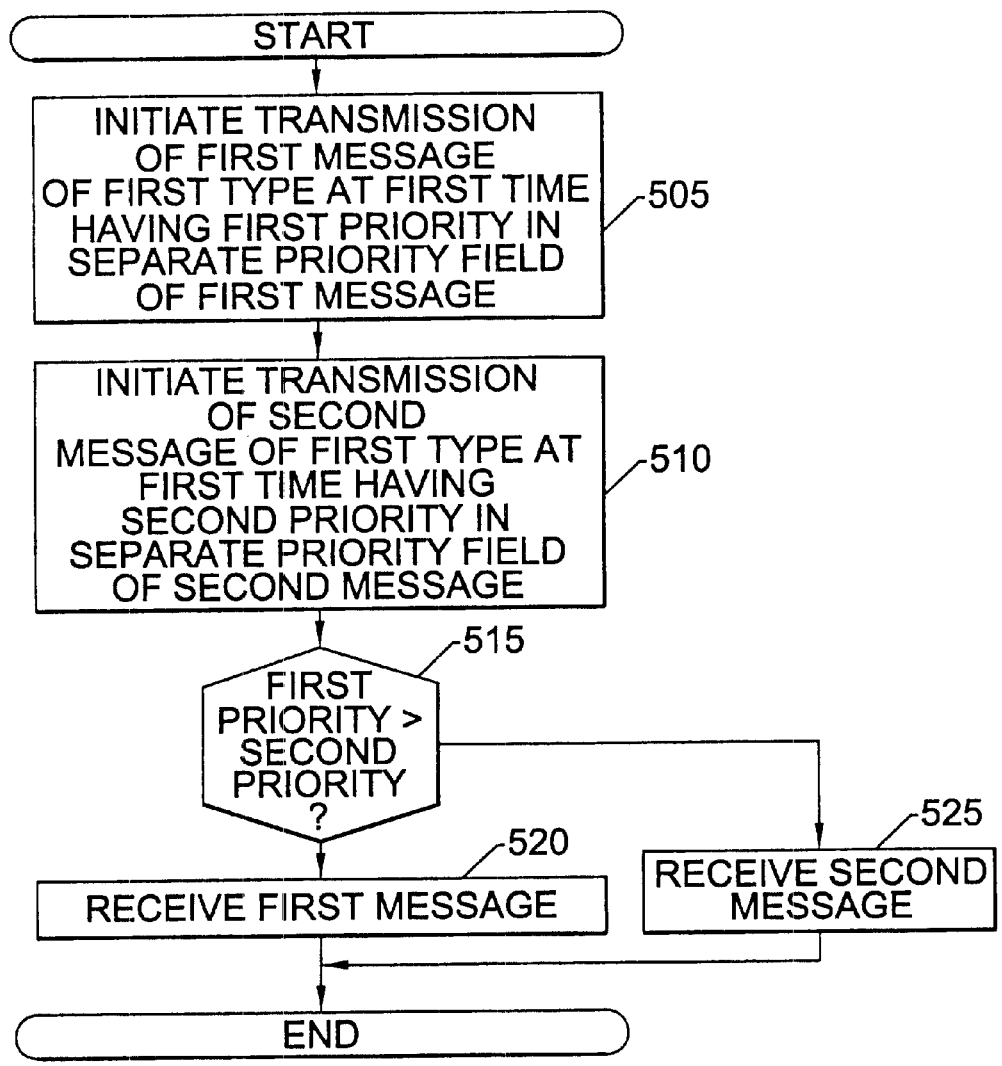
FIG. 8 is a flowchart that illustrates exemplary operations of a UPS system according to an embodiment of the invention.

An example of operations will now be described with reference to the flowchart of FIG. 8. In particular, transmission of a first CAN message over the CAN 108 is initiated from a first module at a first time (block 505). The first message is of a first type and has a first priority. Transmission of a second message over the CAN 108 is initiated from a second module at the first time (block 510). The second message is of the first type and has a second priority. If the first priority is greater than the second priority (block 515), the first message will be allowed to access the CAN 108 and the first message will be received by the module to which the first message is directed (block 520). If, however, the first priority is not higher than the second priority (block 515), the second message will gain access to the CAN 108 for transmission and the second message will be received by the module to which the second message is directed (block 525).

Figure 9:
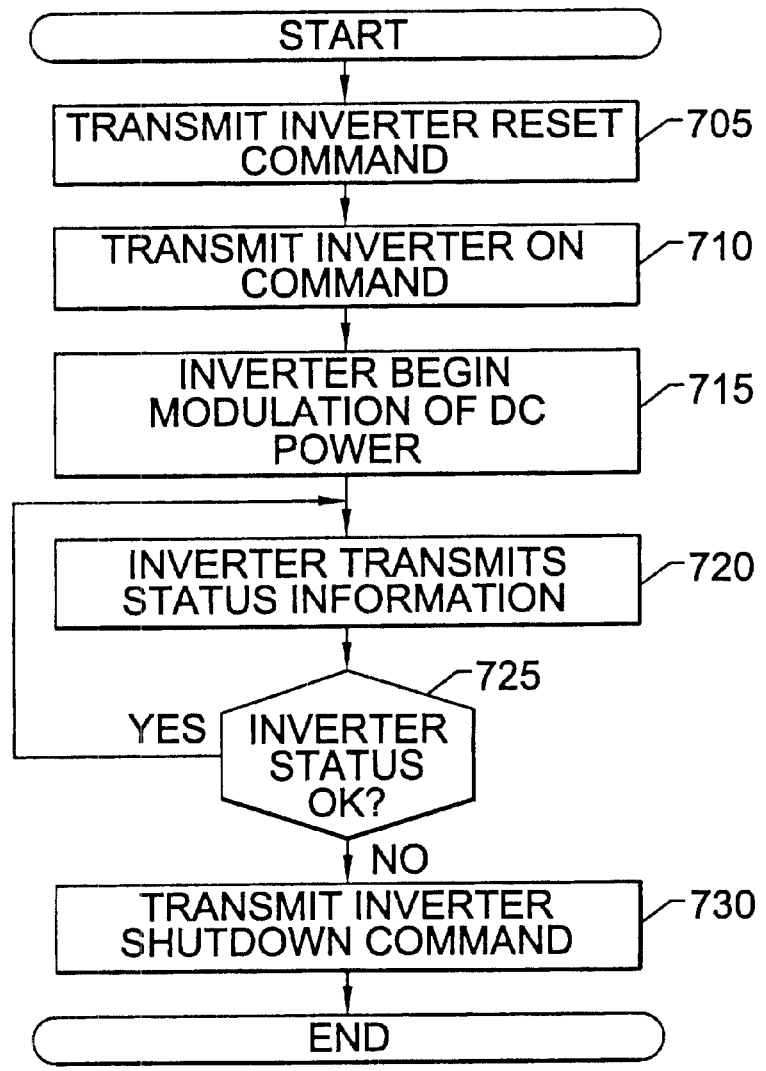
FIG. 9 is a flowchart that illustrates exemplary operations of a UPS system according to another embodiment of the invention.

Referring now to the flowchart of FIG. 9, another example of operations of a UPS system will be described. In particular, operations can begin when the system control module 105 transmits an inverter reset command over the CAN 108 (block 705). The inverter reset command can be the binary string 0000 1010 0000 in the message type field 402 and the binary value of 1 in byte 0 of the data field 406. After receiving the inverter reset command, the inverter module 115 can enter a known state before beginning operations.

The system control module 105 can then transmit an inverter "turn on" command over the CAN 108 (block 710).

The inverter "turn on" command can be the binary string 0000 1010 0000 in the message type field 402 and the binary value of 2 in byte 0 of the data field 406. The inverter "turn on" command can cause the inverter module 115 to begin modulation to convert DC power on the DC bus 109 to AC power.

The inverter module 115 may then begin modulation (block 715) in response to the inverter on command and monitor the AC power output from the inverter module 115. The inverter module 115 may transmit CAN messages over the CAN 108 that indicate the status of the AC power provided by the inverter module 115 (block 720). For example, the inverter module 115 may transmit an inverter data message having a binary value of 1000 1010 0000 in the message type field 402 and the values 0 and 0 in bytes 0 and 1 of the data field 406, respectively, indicating that data bytes 2 through 7 of the data field 406 include data in the category of meter values and in the sub-category of voltage and current. In particular, data bytes 2 through 7 can include the values of the 3 phase output voltage and current meter values measured at the inverter module 115.

If the system control module 105 determines that the 3 phase output voltage and current values are not appropriate (block 725), the system control module 105 can transmit an inverter "shut down" command over the CAN 108 (block 730). In particular, the inverter "shut down" command can have the value 00 in the separate priority field 401 of the CAN message. If the system control module 105 determines that the 3 phase output voltage and current values are appropriate (block 725), the system control module 105 can continue to receive inverter status messages transmitted by the inverter (block 720). Accordingly, the priority of the inverter "shut down" command can be very high, thereby reducing the likelihood that other inverter commands transmitted over the CAN 108 at the same time as the inverter "shut down" command may be awarded access to the CAN 108 over the inverter "shut down" command.

In the drawings and specification, there have been disclosed exemplary embodiments of the invention and, although specific terms are employed, they are used in a generic and descriptive sense only and not for purposes of limitation, the scope of the invention being set forth in the following claims.

What is claimed:

1. A method for communicating information in an Uninterruptible Power Supply (UPS) system, the method comprising the steps of:
    initiating transmission of a first UPS message at a first time according to a UPS controller area network message frame format from a first UPS module in the UPS system, the first UPS message having a first message type and including first priority information in a separate priority field in a first arbitration field of the first message;
    initiating transmission of a second UPS message at the first time according to the UPS controller area network message frame format from a second UPS module in the UPS system, the second UPS message having the first message type and including second priority information in the separate priority field in a second arbitration field of the second message;
    receiving the first UPS message at a third UPS module if the first priority information is a greater priority value than the second priority information; and
    receiving the second message at the third UPS module if the second priority information is a greater priority value than the first priority information.

2. The method of claim 1, wherein the step of initiating transmission of the first message comprises the step of initiating transmission of a first separate data field, the first data associated with a category of data included in the first message, and second data in a second separate data field, the second data associated with a sub-category of the category of data included in the message.

3. The method of claim 1, wherein the third module comprises a bridge module, wherein the step of initiating transmission of a first messages comprises the step of initiating transmission of the first message including first destination routing information in a first separate destination routing field of the first message and the step of initiating transmission of a second message comprises the step of transmitting the second message including the first destination routing information in a second separate destination routing field of the second message, the destination routing information identifies the bridge module in the first UPS system that electrically couples the first UPS system to a second UPS system.

4. The method of claim 3, wherein the method further comprises the step of:
    relaying at least one of the first and second messages to the second UPS system, the at least one of the first and second messages including a system identifier associated with the first UPS system in a separate source routing field of the message.

5. The method of claim 1, wherein the first and second messages include respective first and second module identifiers associated with the respective first and second modules, wherein the first and second identifiers are different.

6. The method of claim 5, wherein the first and second module identifiers comprise first and second module identifiers included in respective separate fields of the first and second messages.

7. The method of claim 6, wherein the separate module identifiers comprise respective binary values.

8. The method of claim 5, wherein the module identifiers comprise location dependent module identifiers that respectively identify the first and second modules.

9. The method of claim 1, wherein the step of initiating transmission of the first message comprises the step of initiating transmission of the first priority information before the first message type and the step of initiating transmission of the second message comprises the step of initiating transmission of the second priority information before the first message type in the second message.

10. The method of claim 1, wherein the step of initiating transmission of the first message comprises the step of initiating transmission of the first message type in a separate message type field of the first message and the step of initiating transmission of the second message comprises the step of initiating transmission of the first message type in a second separate message type field of the second message.

11. The method of claim 10, wherein the first message type comprises a binary value that identifies the first message type as a data message in a first state and identifies the first message type as a command message in a second state.

12. An Uninterruptible Power Supply (UPS) system comprising:
    a UPS controller area network that conducts UPS messages between UPS modules of the UPS system according to a UPS controller area network message frame format;
    a first UPS module, electrically coupled to the UPS controller area network, configured to initiate transmission of a first UPS message at a first time according to the UPS controller area network message frame format over the UPS controller area network, the first UPS message having a first message type and including first priority information in a separate field in a first arbitration field of the first message;

a second UPS module, electrically coupled to the UPS controller area network, configured to initiate transmission of a second UPS message at the first time according to the UPS controller area network message frame format, the second UPS message having the first message type and including second priority information in the separate priority field in a second arbitration field of the second message; and a third UPS module, electrically coupled to the UPS controller area network, configured to receive the first UPS message if the first priority information is a greater priority value than the second priority information and receive the second UPS message if the second priority information is a greater priority value than the first priority information.

13. The UPS system of claim 12, wherein the first message includes first and second data in respective first and second separate data fields, the first data being associated with a category of data included in the first message and the second data being associated with a sub-category of the data included in the message.

14. The UPS system of claim 12, wherein the third module is a bridge module electrically coupled between the first UPS system and a second UPS system;

wherein the first and second messages include first and second respective destination routing information in first and second respective separate destination routing fields of the first and second messages, wherein the destination routing information identifies the bridge module in the first UPS system, the bridge module being configured to relay at least one of the first and second messages from the first UPS system to the second UPS system.

15. The UPS system of claim 14, wherein the bridge module is configured to include a system identifier associated with the first UPS system in a separate source routing field of at least the first and second messages relayed to the second UPS system.

16. The UPS system of claim 12, wherein the first and second messages include first and second respective module identifiers associated with the first and second respective modules.

17. The UPS system of claim 16, wherein the first and second module identifiers comprise first and second module identifiers included in respective separate first and second fields of the first and second messages.

18. The UPS system of claim 17, wherein the separate module identifiers comprise respective binary values.

19. The UPS system of claim 16, wherein the module identifiers comprise location dependent module identifiers that respectively identify the first and second modules.

20. The UPS system of claim 12, wherein the separate priority field comprises two bits of data, the first and second modules being configured to transmit the two bits of data before the first message type.

21. The UPS system of claim 12, wherein the first and second message types of the first and second messages are included in respective first and second separate message type fields.

22. The UPS system of claim 21, wherein the first message type comprises a binary value that identifies the first message type as a data message in a first state and identifies the first message type as a command message in a second state.

23. An Uninterruptible Power Supply (UPS) system comprising:

a UPS controller area network that conducts UPS messages between modules of a first UPS system according to a UPS controller area network message frame format;

a UPS module, electrically coupled to the UPS controller area network, the UPS module being configured to initiate transmission of a UPS message according to the UPS controller area network message frame format over the UPS controller area network, the UPS message including destination routing information in a separate destination routing field in an arbitration field of the UPS message; and a UPS bridge module, electrically coupled to the controller area network and a second UPS system, configured to receive the UPS message if the destination routing information matches a UPS bridge identifier associated with the UPS bridge module and relay the UPS message from the first UPS system to the second UPS system.

24. The UPS system of claim 23, wherein the bridge module includes a system identifier associated with the first UPS system in a separate source routing field of message relayed to the second UPS system.

25. A computer program product for communicating information in an Uninterruptible Power Supply (UPS) system, the computer program product comprising:

a computer readable storage medium having computer-readable program code embodied in said medium, said computer-readable program code comprising:

computer-readable program code that initiates transmission of a first UPS message at a first time according to a UPS controller area network message frame format from a first UPS module in the UPS system, the first UPS message having a first message type and including first priority information in a separate priority field in a first arbitration field of the first message;

computer-readable program code that initiates transmission of a second UPS message at the first time according to the UPS controller area network message frame format from a second UPS module in the UPS system, the second UPS message having the first message type and including second priority information in a second separate priority field in a second arbitration field of the second message;

computer-readable program code that receives the first UPS message at a third UPS module if the first priority information is a greater priority value than the second priority information; and computer-readable program code that receives the second UPS message at the third UPS module if the second priority information is a greater priority value than the first priority information.

26. The computer program product of claim 25, wherein the computer-readable program code that initiates transmission of the first message comprises computer-readable program code that initiates transmission of first data in a first separate data field, the first data associated with a category of data included in the first message, and second data in a second separate data field, the second data associated with a sub-category of the category of data included in the message.

27. The computer program product of claim 25, wherein the computer-readable program code that initiates transmission of the first message comprises computer-readable program code that initiates transmission of the first message including first destination routing information in a first separate destination routing field of the first message, wherein the computer-readable program code that initiates transmission of the second message comprises computer-readable program code that initiates transmission of the first destination routing information in a second separate destination routing field of the second message, and wherein the destination routing information identifies a bridge module in the first UPS system that electrically couples the first UPS system to a second UPS system.

28. The computer program product of claim 27 further comprising: computer-readable program code that relays at least one of the first and second messages to the second UPS system, the at least one of the first and second messages including a system identifier associated with the first UPS system in a separate source routing field of the message.

29. The computer program product of claim 25, wherein the first and second messages include respective first and second module identifiers associated with the respective first and second modules.

30. The computer program product of claim 29, wherein the first and second module identifiers comprise first and second module identifiers included in respective separate fields of the first and second messages.

31. A method for communicating information in an Uninterruptible Power Supply (UPS) system, the method comprising the steps of:
   initiating transmission of a first UPS message over a UPS controller area network in the UPS system at a first time according to a UPS controller area network message frame format from a first UPS module in the UPS system, the first UPS message having a first message type in an arbitration field of the message; and
   receiving the first UPS message via the UPS controller area network in the UPS system, the method further comprising the steps of:
      initiating transmission of the first UPS message at the first time according to the UPS controller area network message frame format from the first UPS module in the UPS system, the first UPS message including first priority information in a first separate priority field in the first arbitration field of the first message;
      initiating transmission of a second UPS message at the first time according to the UPS controller area network message frame format from a second UPS module in the UPS system, the second UPS message having the first message type and including second priority information in a second separate priority field in a second arbitration field of the second UPS message;
      receiving the first UPS message at a third UPS module if the first priority information is a greater priority value than the second priority information; and
      receiving the second UPS message at the third UPS module if the second priority information is a greater priority value than the first priority information.

32. The method of claim 31, wherein the step of initiating transmission of the first UPS message comprises the step of initiating transmission of a first separate data field, the first data associated with a category of data included in the first UPS message, and transmission of second data in a second separate data field, the second data associated with a subcategory of the category of data included in the first UPS message.

33. The method of claim 31, wherein the USP system comprises a first UPS system, wherein the third UPS module comprises a bridge module, wherein the step of initiating transmission of a first UPS message comprises the step of initiating transmission of the first UPS message including first destination routing information in a first separate destination routing field of the first UPS message and the step of initiating transmission of a second UPS message comprises the step of transmitting the second UPS message including the first destination routing information in a second separate destination routing field of the second UPS message, the destination routing information identifies the bridge module in the first UPS system that electrically couples the first UPS system to a second UPS system.

34. The method of claim 33, wherein the method further comprises the step of:
   relaying at least one of the first and second UPS messages to the second UPS system, the at least one of the first and second UPS messages including a system identifier associated with the first UPS system in a separate source routing field of the at least one of the first and second UPS messages.

35. The method of claim 31, wherein the first and second UPS messages include respective first and second UPS module identifiers associated with the respective first and second UPS modules, wherein the first and second UPS module identifiers are different.

36. The method of claim 35, wherein the first and second UPS module identifiers comprise first and second module UPS module identifiers included in respective separate fields of the first and second UPS messages.

37. The method of claim 36, wherein the separate UPS module identifiers comprise respective binary values.

38. The method of claim 35, wherein the UPS module identifiers comprise location dependent UPS module identifiers that respectively identify the first and second UPS modules.

39. The method of claim 31, wherein the step of initiating transmission of the first UPS message comprises the step of initiating transmission of the first priority information before the first message type and the step of initiating transmission of the second UPS message comprises the step of initiating transmission of the second priority information before the first message type in the second UPS message.

40. The method of claim 31, wherein the step of initiating transmission of the first UPS message comprises the step of initiating transmission of the first message type in a separate message type field of the first UPS message and the step of initiating transmission of the second UPS message comprises the step of initiating transmission of the first message type in a second separate message type field of the second UPS message.

41. The method of claim 40, wherein at least one of the first and second message types comprises a binary value that identifies the at least one of the first and second message types as a data message in a first state and identifies the at least one of the first and second message types as a command message in a second state.

* * * * *

UNITED STATES PATENT AND TRADEMARK OFFICE
CERTIFICATE OF CORRECTION

PATENT NO. : 6,629,247 B1
DATED : September 30, 2003
INVENTOR(S) : Hall et al.

It is certified that error appears in the above-identified patent and that said Letters Patent is hereby corrected as shown below:

<u>Title page, Item [54] and Column 1, lines 1-5,</u>
Title, should read -- SYSTEM FOR COMMUNICATIONS IN UNINTERRUPTIBLE POWER SUPPLY BY USING CONTROL AREA NETWORKS FOR COMMUNICATING UPS MESSAGES INCLUDING PRIORITY INFORMATION --

Signed and Sealed this

Twenty-seventh Day of April, 2004

JON W. DUDAS
*Acting Director of the United States Patent and Trademark Office*